No. 881,869. PATENTED MAR. 10, 1908.
R. H. RICE.
GOVERNING MECHANISM FOR TURBINES.
APPLICATION FILED JUNE 7, 1905.

5 SHEETS—SHEET 1.

Witnesses:
Lloyd C. Bush
Alex F. Macdonald

Inventor,
Richard H. Rice,
By Albert G. Davis
Att'y.

No. 881,869. PATENTED MAR. 10, 1908.
R. H. RICE.
GOVERNING MECHANISM FOR TURBINES.
APPLICATION FILED JUNE 7, 1905.

5 SHEETS—SHEET 4.

Witnesses:
Lloyd C. Bush
Alex F. Macdonald

Inventor,
Richard H. Rice,
By Albert G. Davis
Att'y.

No. 881,869. PATENTED MAR. 10, 1908.
R. H. RICE.
GOVERNING MECHANISM FOR TURBINES.
APPLICATION FILED JUNE 7, 1905.

5 SHEETS—SHEET 5.

Witnesses:
Lloyd C. Bush
Alex F. Macdonald

Inventor,
Richard H. Rice,
By Albert G. Davis
Att'y.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

GOVERNING MECHANISM FOR TURBINES.

No. 881,869.  Specification of Letters Patent.  Patented March 10, 1908.

Application filed June 7, 1905. Serial No. 264,059.

*To all whom it may concern:*

Be it known that I, RICHARD H. RICE, a citizen of the United States, residing at Lynn, county of Essex, State of Massachusetts, have invented certain new and useful Improvements in Governing Mechanism for Turbines, of which the following is a specification.

The present invention relates to governing mechanism for prime movers, such for example, as elastic fluid turbines or other motors. Its object is to provide a governing mechanism of improved construction which will operate to entirely shut off the supply under emergency conditions, as when a critical speed of rotation is reached.

Figure 1:
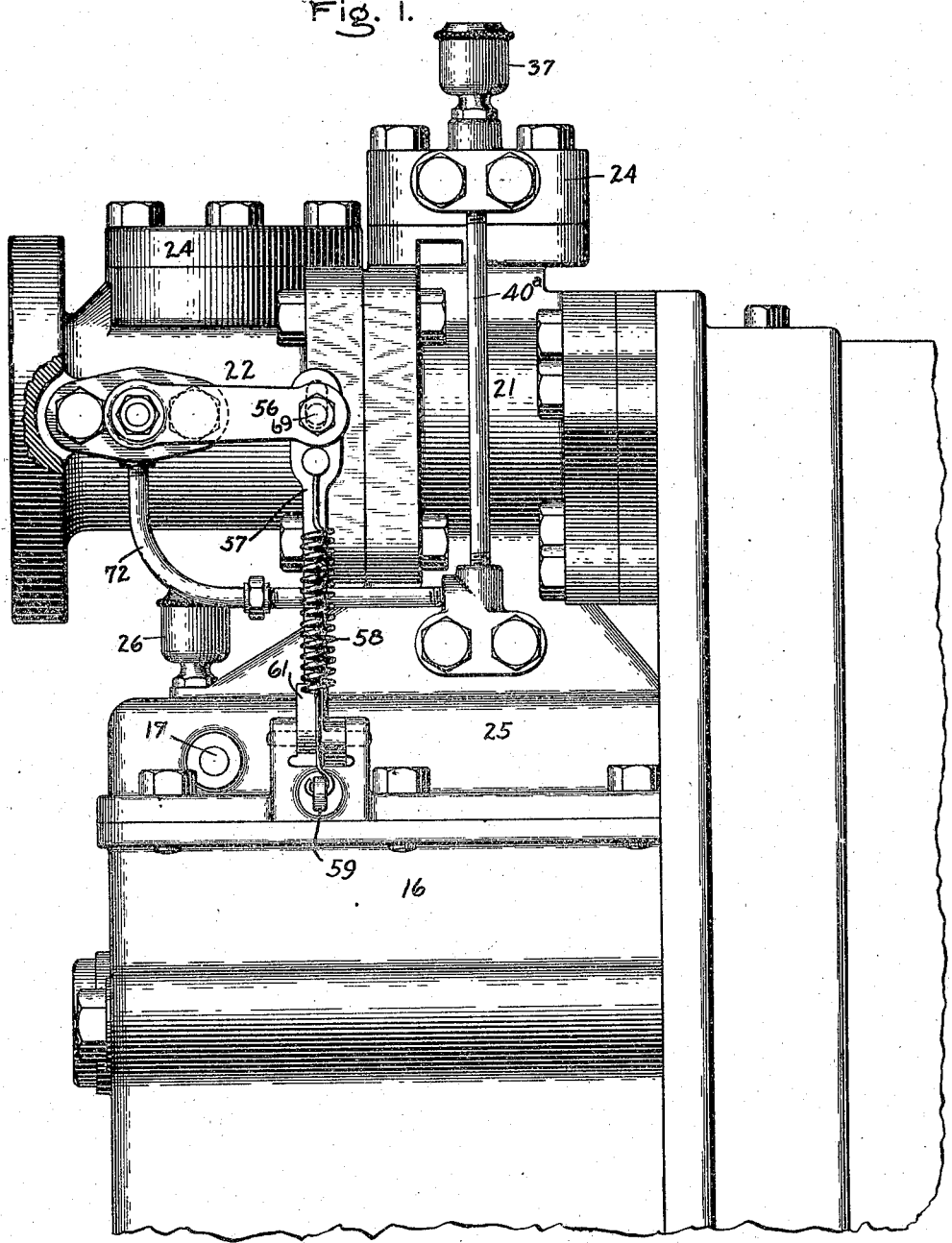
Figure 2:
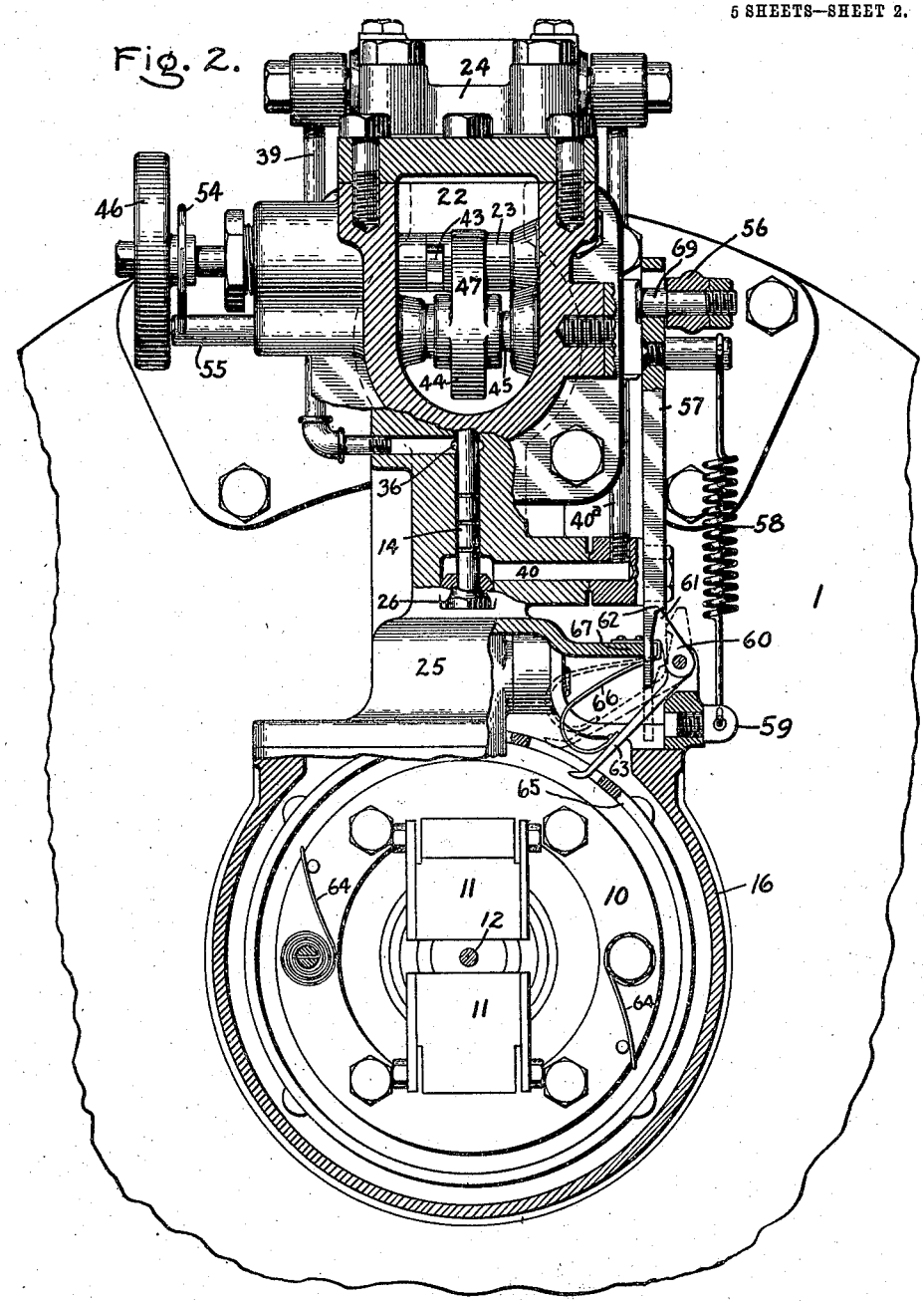
Figure 3:
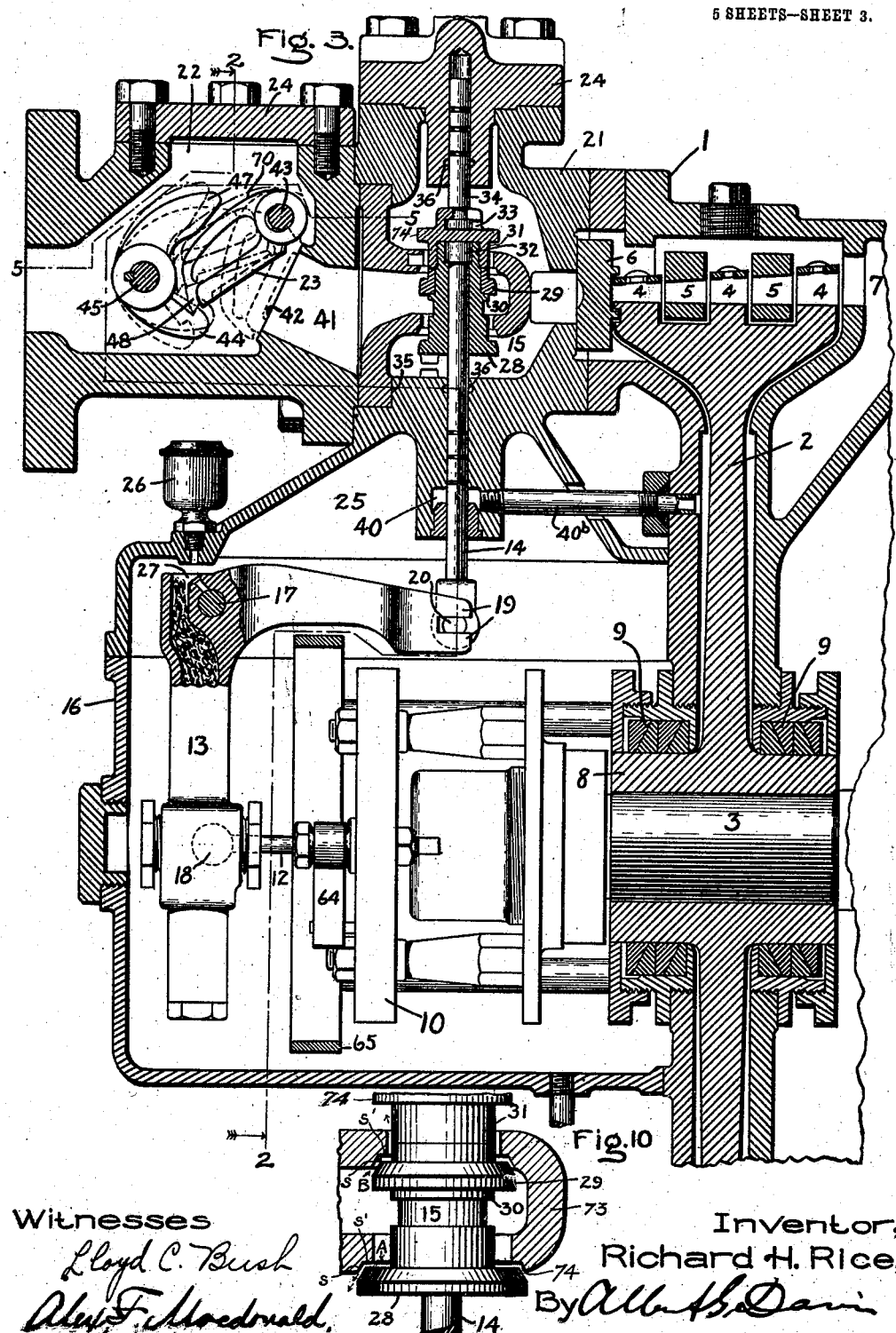
Figure 4:
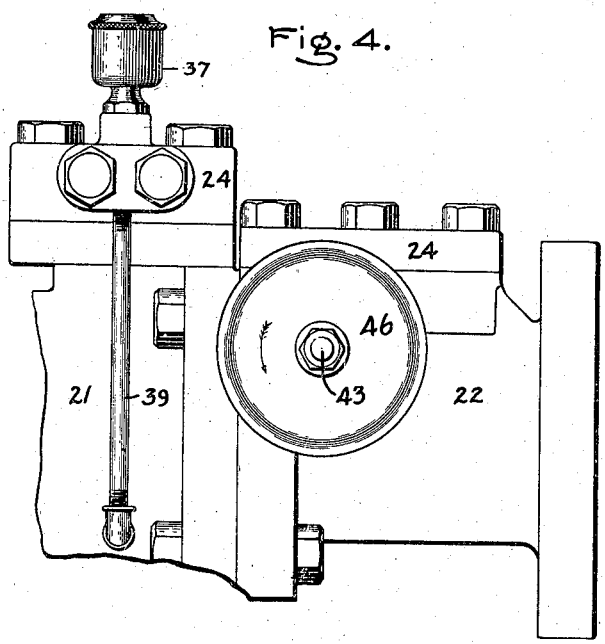
Figure 5:
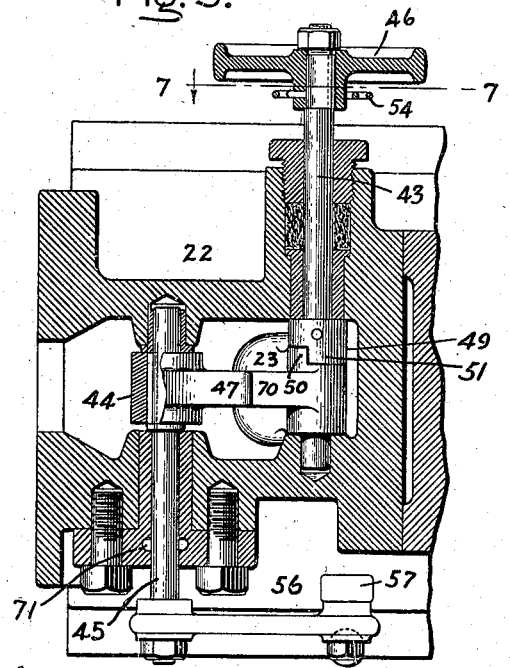
Figure 6:
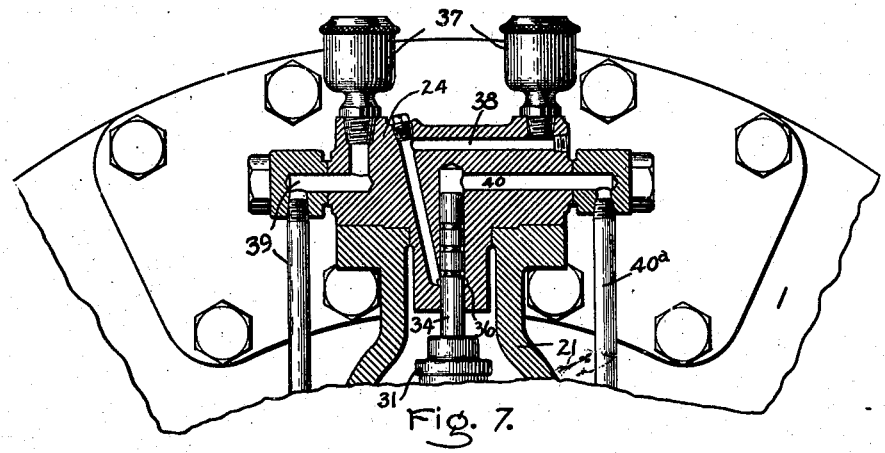
Figure 7:
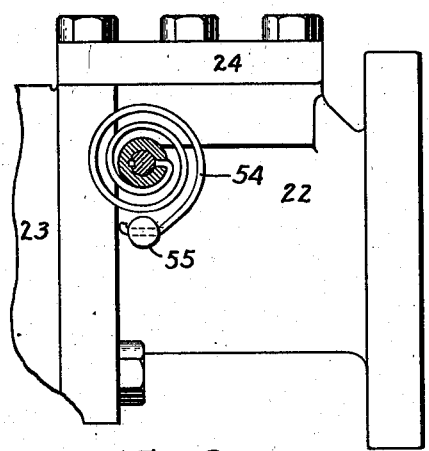
Figure 8:
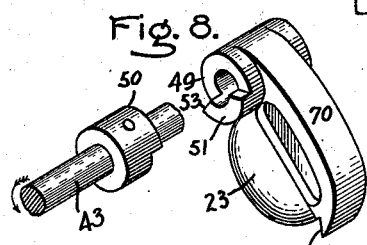
Figure 9:
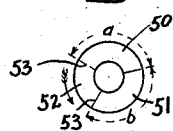

For an understanding of the invention, attention is directed to the following description and to the claims appended hereto.
In the accompanying drawings which illustrate one embodiment of the invention, Figure 1 is a partial side elevation of an elastic fluid turbine showing the governing mechanism applied thereto; Fig. 2 is a transverse section through the governing mechanism on line 2—2, Fig. 3, looking in the direction indicated by the arrows; Fig. 3 is a vertical longitudinal section through the emergency valve, the regulating valve, the governor casing and partially through the turbine; Fig. 4 is a side elevation of the emergency valve steam chest showing the hand wheel on resetting the valve; Fig. 5 is a section through the valve chest on line 5—5, Fig. 3; Fig. 6 is a transverse section of the upper portion of the regulating valve chest; Fig. 7 is a section on line 7—7, Fig. 5, looking in the direction indicated by the arrow; Fig. 8 is a perspective view of the emergency valve and its spindle as assembled and showing the lost-motion device which permits the valve to close suddenly; Fig. 9 is a diagram of the parts of the lost-motion device; and Fig. 10 is a detail view of the regulating valve.

Referring to the drawings, 1 represents the casing of the turbine inclosing a bucket wheel 2 which is mounted on a shaft 3, Fig. 3. On the periphery of the wheel is arranged one or more rows of buckets 4 against which motive fluid is directed. When more than one row of wheel buckets are employed, as in the present instance, intermediate buckets 5 are arranged between the rows, extending partially or entirely around the wheel and which may be movable or stationary as desired, their function being to change the direction of flow of the motive fluid as it passes from a preceding to a succeeding row of buckets. The buckets receive steam or other elastic fluid from suitable discharge devices, such as nozzles or nozzle sections, arranged adjacent the periphery of the wheel in the plate 6 or other support. These nozzles may be expanding or non-expanding, as preferred. The motive fluid passes from the buckets into an exhaust conduit 7 which may connect with another set of nozzles and buckets if the turbine be of the multi-stage type, or with a condenser, or the atmosphere. On the shaft 3, or the hubs 8 of the wheel are packings 9 for preventing the escape of fluid from the casing.

Secured to the end of the shaft 3 in any suitable manner is a frame 10, Figs. 2 and 3, which carries the weights 11 of the governor, the weights being omitted in the latter figure for convenience of illustration. The weights are adapted to act against the weighted and yielding abutment as is usual in governors and to impart longitudinal motion to a stem 12 arranged axially in line with the shaft 3. The movement of the stem 12 is transmitted through a bell-crank lever 13, to the stem 14 of the regulating valve 15. The bell-crank lever is preferably a single piece and is mounted in a governor casing 16 with its vertical arm extending transversely of the stem 12 and its horizontal arm extending over the governor toward the turbine casing and connected at its extremity to the valve stem. The pivot 17 of the lever is located at its elbow so that the oscillations, due to the action of the governor, are converted into vertical reciprocation of the valve stem. In order to afford the necessary flexibility between the governor and the lever, a ball-and-socket joint 18 is provided between the stem 12 and the lever, the joint also detachably connecting them. The extremity of the horizontal arm of the lever is formed with parallel jaws 19, in which are freely movable trunnions 20 carried at the lower end of the valve stem. The head which carries the trunnions is removable.

Arranged above the governor in overhanging relation thereto is a regulating valve chest 21 and an emergency valve chest 22 containing an emergency valve 23. The chests are preferably made separate and bolted together, the regulating valve chest in turn being bolted to the turbine casing adjacent the periphery thereof and at the nozzles. To permit access to the interior, each chest is provided with a removable cover 24. The lower portion of the regulating valve chest is expanded into a shell or enlargement 25, Fig. 3, to form a top or cover for the governor casing. Supported on this portion of the casing is an oil cup 26 arranged in line with the vertical arm of the bell-crank lever 13. This arm is hollow and is provided with a mouth 27 at its upper end into which lubricant is fed from the cup. The arm contains cotton waste or other suitable absorbent which serves to keep the ball-and-socket joint 18 properly lubricated. Sufficient lubricant creeps out from the joint to the adjacent parts of the governor to lubricate them.

The regulating valve is of the balanced-type. It comprises a sleeve formed with an annular flange 28 at its lower end which serves as one valve disk, and a collar 29 fitted around the sleeve and resting on its shoulder 30 serves as the other valve disk, the flange and the collar both having the same area exposed to the motive fluid on the inlet side. The collar 29 is secured in place on its shoulder by a cap 31 which screws on the exteriorly threaded upper end of the sleeve. The valve stem 14 extends through the hollow of the sleeve and at its upper end is provided with a shouldered portion 32, which may be a removable collar, and engages in the counter bore of the sleeve at its upper end. This shoulder 32 and the cap 31 coöperate to prevent endwise movement of the valve on its stem. The cap 31 is provided with a transversely extending slot 33, Fig. 3, having overhanging jaws which engage and hold the guide stem 34. The parts can be disengaged by a sidewise movement. The seat for the valve comprises a member U-shaped in cross-section, which is supported in a shouldered recess or depression 35 in one of the adjacent surfaces of the two valve chests and is held in the depression by the bolts that secure the chests. By this arrangement the seat can be readily removed for regrinding or other purposes. The stems 14 and 34 of the valve are provided with a number of annular grooves which serve to collect the moisture escaping from the valve chest, and form hydraulic packings. To lubricate the stems, lubricant is fed to small annular passages or chambers 36 in the walls surrounding the stems, and lubricant feeds therefrom along the stem with the escaping moisture. As shown in Figs. 2 and 6, the annular chambers 36 are supplied from all cups 37 arranged on the cover of the regulating valve chest. One cup supplies lubricant through the conduit 38 to the chamber around the guide stem 34 and the other cup supplies the chamber 36 of the valve stem through the conduit and pipe 39, Figs. 2 and 6. At the outer ends of the stems are collecting chambers 40 for the condensed water or moisture which escapes along the stem from the valve chests. These two chambers communicate through a pipe 40$^a$ so that the upper chamber may drain into the lower, and from the lower chamber the water of evaporation and condensation drains through a pipe 40$^b$, Figs. 2, 3 and 6, to the turbine casing.

The emergency valve chest communicates with the regulating valve chest through a port 41, and the inlet end of the port is finished to form a seat 42 for the emergency valve, Fig. 3. The valve is of the swinging type loosely mounted on a horizontal spindle 43 located above the seat so that the valve has a tendency to close under the action of gravity. A certain amount of play is provided between the valve and its spindle so as to insure proper seating. The valve is adapted to be held open by an oscillating latch or lock 44, which when released, permits the valve to close. The latch is mounted within the chest and rocks with a shaft 45 suitably journaled in the walls of the chest. The spindle 43 extends exterior to the valve chest and carries a hand wheel 46 by which the valve can be reset. The hand wheel is made with smooth finished surfaces so that it cannot be fastened in a position to hold the valve open. This reduces the liability of accidents due to a careless attendant. In order to enable the lock to be raised to its set or normal position simply by the turning of the hand wheel, a projection or finger 47 is formed on the lock and disposed in the path of movement of the valve so that when the latter is raised, motion is imparted to the lock by reason of the valve wiping against the projection, thus throwing the lock under the lip 48 of the valve, Figs. 3 and 8. In order to permit the valve to fall suddenly, and without the hand wheel and spindle being carried with it, a lost-motion device 49, Figs. 5 and 8, is provided. This comprises overlapping lugs or projections 50 and 51 formed, respectively, on the hub of the valve and on a collar keyed to the valve spindle. Either or both of these projections are less than one hundred and eighty degrees, measured on the arcs $a$ and $b$, Fig. 9, thus leaving a sector-shaped space 52 between surfaces 53 through which the lug 51 is capable of moving during the closing of the valve without engaging with the other lug. When it is desired to open the valve, the hand wheel and spindle are turned in the direction indicated by the arrow, Figs. 4, 8 and 9, which causes the projection 50 to move toward and engage with the projection 51 at the surfaces 53, and by continued movement raise the valve. In order that the projection 50 may automatically disengage and return to its normal position, a spring 54 is arranged at or near the hand wheel, one end being anchored at 55 and the free end attached to the hand wheel or spindle. During the opening movement of the valve, the spring is placed under stress so that as soon as the operator releases the hand wheel, the projections 50 and 51 disengage and thus permit the valve to fall freely when the latch is released. A suitable packing is provided around the valve spindle, as shown in Fig. 5, to prevent leakage from the chest.

The device for releasing the lock or latch under abnormal or emergency conditions comprises the following: On the shaft 45 at a point exterior to the casing is an arm or crank 56, Figs. 1, 2 and 5, which is actuated by a suddenly-acting-weighted member, that preferably takes the form of a longitudinal movable rod or actuator 57, Figs. 1 and 2. This rod is actuated by a spiral contractile spring 58 (or its equivalent) which is secured at one end thereto and at the other end to a suitable anchor 59 fixed to the governor casing. At the lower end or at any other suitable position, a trigger 60 is arranged which is adapted to hold the rod or actuator in its set or energized position. The trigger is provided with a nose 61 which engages under a notch 62 in the rod or actuator so as to hold the latter in set position. The trigger is also provided with an arm 63 which extends through the wall of the governor casing from a point without to a point within where it lies in the path of one or more centrifugally-acting springs or other device 64, Figs. 2 and 3, which are mounted on the governor frame 10. The free ends of the springs are adapted to be deflected outwardly at excessively high speeds to strike the inner end of the arm 63, imparting thereby to the trigger a motion which releases the nose 61 from the notch 62. This permits the rod 57 to operate under the influence of the spring 58 and rock the shaft 45 through the crank or arm 56. The motion imparted to the arm 56 by the actuator is in the nature of a hammer blow, thereby suddenly releasing the lock or latch 44 and causing the projection 47 thereof to impart a hammer blow directly to the valve and insuring its sudden closure. Around the path of the centrifugally-acting springs 64 is a stationary ring 65 which acts as a damper to prevent undue vibration of the springs after they have struck and released the trigger.

The trigger is provided with a spring 66, Fig. 2, which is capable of resetting it during the operation of resetting the emergency valve, and this without attention on the part of the operator. The spring is made of a flat strip and looped, one end being anchored on an extension or portion 67 of the governor casing and the free end is secured to the arm 63 of the trigger. The fixed end of the spring is disposed adjacent the nose of the trigger and is shaped to form a stop for the trigger when the trigger is reset, as shown in Fig. 2. When the projection and stop are thus engaged the rod or actuator 57 is prevented from moving under the tension of its spring, but when they are released by the trigger being thrown to the position shown in dotted lines, the rod is free to move. After the rod has operated, the trigger is held in the position indicated by dotted lines by the rod itself. In this position the trigger spring 66 is flexed so that the trigger will automatically return to its normal position when the rod or actuator is raised to its normal position by the setting of the emergency valve.

Referring to Fig. 3, the emergency valve and the latch are shown in their set or operative position by full lines; in their released or closed position by dotted lines, and in their extreme position, assumed during the setting of the valve, by the dot-and-dash lines, these being referred to as first, second and third positions, respectively. To open the valve, the valve and latch are moved from the second to the third position by means of the hand wheel. The raising of the emergency valve actuates the lock or latch, causing in turn the crank or arm 56 keyed to the lock or latch shaft 45, to be raised at its outer end. This raises the actuator or rod and permits the trigger to reset. It will be observed that in order to permit the latch to fall back from the third to the first position, a lost-motion must be provided between the crank or arm and the actuator or rod 57. For this purpose the upper end of the actuator is slotted and the pin 69 connecting the crank or arm to the actuator is arranged to freely move in the slot. By reason of this lost-motion, the lock will fall as soon as the operator releases the pressure on the hand wheel and come to rest in its first position so as to engage under the lip 48 of the valve. When the parts are in the normal or first position, the pivot 69 is at the bottom of the slot, as shown in Figs. 1 and 2. Another important feature of this lost-motion connection between the actuator and the crank is that it permits the actuator to move a slight distance or get underway before it imparts motion to the arm and thereby produces a hammer blow effect. A web or abutment 70, Figs. 3 and 8, is formed on the emergency valve to receive the impact from the projection 47 on the lock, and also to obtain the proper relation between the valve and lock. By reason of this arrangement the lost-motion which has to be taken up in resetting the valve is small.

Any moisture that passes from the emergency valve chest along the shaft 45 is collected in an annular chamber 71, Fig. 5, from which it drains through the pipe 72 to the chamber 40 at the lower end of the regulating valve stem and thence to the turbine casing.

The regulating valve 15 is so constructed that a suitable throttling action is secured and the impact and reactive effects of the flowing steam do not disturb the balanced condition of the valve when it is open. In Fig. 10, the valve, which is of the double puppet type, is shown. The disk portions 28 and 29 are circumferentially beveled and the seat-containing wall or diaphragm 73 is provided with ports shaped to correspond to the beveled portions of parts 28 and 29. The seats are formed by the conical surfaces $s$ and the contiguous surfaces $s^1$ with which engage, respectively, the bevel and top of the disk portions. The throttling action is due to the beveled portions of the disks and the corresponding portions of the seat-containing wall. Thus when the horizontal surfaces of the seats and the corresponding surfaces of the disks are separated by a given distance, the width of the annular flow space between the beveled surfaces will be but substantially one half of that distance. When closed the pressure tending to press the valve against the upper seat is equal but opposite to the pressure which tends by its action upon the disk 28 to move the valve away from its lower seat. When open, steam flowing from the annular region A impinges on the horizontal surface of the lower valve disk tending to move it downward. Similarly steam issuing from the annular region B passing over the surfaces $s$ and $s^1$ and flowing upward impinges on the annular surface of the flange 74, formed on the cap 31 for this purpose, and balances the action just described. Hence the balanced condition of the valve is not disturbed by the impact of the flowing steam when it is moved from its balanced closed position to its open position. Steam flowing from the region B over the surface $s$ will impinge against the valve seat which is stationary. In issuing at high velocity from the space between the valve and its seat into the region of lower velocity in the chest, the steam will also react against the surface of the seat but not against the valve. The same remarks apply to the steam issuing in the other direction from the region A and flowing into the region of lower velocity in the valve chest.

With the governing mechanism as described, the normal load changes are taken care of by the regulating valve, which with variations in speed, has a slight reciprocating or to-and-fro movement whereby the admission of motive fluid to the turbine nozzles is increased with decreasing speed of the turbine and decreased with increasing speed. If for any reason the speed of rotation should become excessive, the emergency governor is called into play, thereby releasing the emergency valve and cutting off the entire supply to the turbine.

While a turbine of the well-known Curtis type has been described, it is obviously within the scope of my invention to employ any other type of turbine, whether the same be an axial or radial flow, or a combination of both.

The regulating valve mechanism and the arrangement of the valve chests, governor and its casing, are not claimed herein because they form the subjects matter of my divisional applications, Serial No. 349,243, filed December 24, 1906 and Serial No. 377,137 filed June 4, 1907, in response to requirements for division made by the United States Patent Office under the provisions of Rules 41 and 42 of Office Practice.

In accordance with the provisions of the patent statutes, I have described the principle of operation of my invention together with the apparatus which I consider to represent the best embodiment thereof; but I desire to have it understood that the apparatus shown is only illustrative, and that the invention can be carried out by other means.

What I claim as new and desire to secure by Letters Patent of the United States is, —

1. In a governing mechanism, the combination of a quick closing emergency valve pivoted to have a swinging movement, means for releasing the same from its set position which includes a weighted member, a trigger arranged to interlock with the said member when the valve is set, and a speed-responsive device arranged and adapted to strike and release the trigger to permit the member to act.

2. In a governing mechanism, the combination of a valve, a single member arranged to hold the valve in one position under normal conditions and to impart a hammer blow thereto to actuate it under abnormal conditions, and a device for imparting a hammer blow to the said member and through it to the valve.

3. In a governing mechanism, the combination of an emergency valve mounted to have a tendency at all times to close, a lock or latch arranged to engage the valve and hold it open, and means for releasing the latch and actuating it to impart a hammer blow directly to the valve.

4. In a governing mechanism, the combination of an emergency valve, a lock which engages the valve to hold it open, a projection on the lock which is normally separated from the valve by a clearance sufficient to permit the lock to be disengaged and impart a hammer blow thereto substantially simultaneously with the release of the lock, and a speed-responsive device for actuating the lock.

5. In a governing mechanism, the combination of a valve chest, an emergency valve therein, a lock within the chest which engages the valve to hold it open, an arm exterior to the chest for disengaging the lock from the valve to permit the latter to close, and a means for imparting a hammer blow to said arm.

6. In a governing mechanism, the combination of a valve chest, an emergency valve therein, a lock within the chest which engages the valve to hold it open, an arm exterior to the chest for disengaging the lock from the valve to permit the latter to close, and a weighted member connected with the arm through a lost-motion for imparting a hammer blow thereto.

7. In a governing mechanism, the combination of a valve chest, an emergency valve therein, a lock within the chest for holding the valve in open position, a projection on the lock which is disposed on the side thereof opposite to that engaged by the valve, and means for releasing the lock and causing the projection to assist in closing the valve.

8. In a governing mechanism, the combination of a valve chest, an emergency valve therein, a lock arranged to engage the valve and hold it open, an arm for actuating the lock to release the valve, a weighted member which imparts motion to the arm, a lost-motion connection between the arm and said member, and a trigger device for actuating the said member.

9. In a governing mechanism, the combination of a valve chest, an emergency valve therein, a lock for holding the valve open, an arm for moving the lock to release the valve, a longitudinally movable actuator for operating the arm, means for weighting or energizing the actuator, a trigger which engages the actuator and holds it energized, and a speed-responsive device which acts upon the trigger to release the actuator.

10. In a governing mechanism, the combination of a valve chest, an emergency valve therein, a lock for holding the valve open, an arm for moving the lock to release the valve, a longitudinally movable actuator for operating the arm, a lost-motion connection between the actuator and the arm, a spring for the actuator, a speed-responsive device, a casing therefor, and a trigger which extends into the casing in operative relation to the speed-responsive device and is adapted to hold the actuator under the tension of the spring and release it when the speed-responsive device operates.

11. In a governing mechanism, the combination of an emergency valve, means for moving the valve, a rod for actuating said means, a spring for operating the rod, a speed-responsive device, a casing therefor, a trigger adapted to be operated by said device which is arranged partly within and partly without the casing, and an interlocking means between the trigger and the said rod which holds the latter under the tension of the spring and releases it when the trigger is acted upon by the speed-responsive device.

12. In a governing mechanism, the combination of an emergency valve, a lock for holding the valve open, a weighted member for actuating the latch to release the valve, a self-setting trigger which holds the said member in energized position and when actuated disengages it, and a means for resetting the lock and valve which actuates the member to permit the trigger to reset.

13. In a governing mechanism, the combination of an emergency valve, a locking device which holds the valve open, a self-setting trigger which actuates the locking device, and means for setting the valve which acts through the latter and the locking device to permit the trigger to automatically reset.

14. In a governing mechanism, the combination of an emergency valve, a locking device which holds the valve in a predetermined position, a trigger for controlling the locking device, a spring which retracts the trigger, and a hand operated means for setting the valve which also imparts motion to the locking device to permit the trigger to reset under the action of its spring.

15. In a governing mechanism, the combination of an emergency valve, a lock for holding the valve open, a means for releasing the lock which includes a self-setting trigger, a means on the lock which causes the valve as it opens to reset the lock and to permit the trigger to reset, and a manually operated means for opening the valve.

16. In a governing mechanism, the combination of a valve, a lock having one portion which engages the valve to hold it open and another portion which engages the valve when the latter opens and receives motion therefrom, means for actuating the lock to release the valve, said means including a suddenly-acting-releasing device, and a hand operated means which opens the valve and acts through the latter to set the lock and also the releasing device.

17. In a governing mechanism, the combination of a valve, a lock having one portion which engages the valve to hold it open and another portion which engages the valve when the latter opens and receives motion therefrom, means for actuating the lock to release the valve, said means including a suddenly-acting-releasing device, a hand operated means which opens the valve and acts through the latter to set the lock and also the releasing device, and a lost-motion connection between the hand operated means and the valve which permits the latter to close independently of said means.

18. In a governing mechanism, the combination of a valve, a lock which holds the valve open and is adapted to be reset by the valve, means for actuating the lock to release the valve, said means including a suddenly-acting-releasing device, a hand wheel for opening the valve, a lost-motion connection between the hand wheel and the valve which permits the latter to close independently of the hand wheel, and a spring which normally maintains the lost-motion connection between the valve and hand wheel open.

19. In a governing mechanism, the combination of a valve, a lock for holding the valve open, a projection on the lock which is arranged to cause the latter to be set by the valve during the opening thereof, an arm connected with the lock for operating it, a weighted member for operating the arm, a trigger device controlling the said member, and a lost-motion connection between the arm and the member which permits the valve during its opening movement to act through the lock and the said member for setting the trigger device and for permitting the lock to engage with the valve after the trigger is set.

20. In an elastic fluid motor, the combination of a revolving element, a casing therefor, a shut-off valve, a speed-responsive device for controlling the action of the valve, and a hand wheel located outside of the casing for resetting the valve after it has been tripped by the speed-responsive device, the said wheel being provided with smooth surfaces so that it cannot be fastened in a given position.

In witness whereof, I have hereunto set my hand this twenty-fifth day of May, 1905.

RICHARD H. RICE.

Witnesses:
JOHN A. McMANUS, Jr.,
HENRY O. WESTENDARP